United States Patent [19]

Schrader et al.

[11] Patent Number: 4,917,432
[45] Date of Patent: Apr. 17, 1990

[54] STIFFENING OF A SURFACE PORTION OF A FLEXIBLE ROOF SKIN OF A VEHICLE

[75] Inventors: Jürgen Schrader, Stuttgart; Klaus Claar, Sindelfingen, both of Fed. Rep. of Germany

[73] Assignee: Daimler-Benz AG, Stuttgart, Fed. Rep. of Germany

[21] Appl. No.: 233,005

[22] Filed: Aug. 17, 1988

[30] Foreign Application Priority Data

Aug. 17, 1987 [DE] Fed. Rep. of Germany ....... 3727338

[51] Int. Cl.$^4$ ................................................ B06J 7/08
[52] U.S. Cl. ................................... 296/118; 296/120.1
[58] Field of Search ............... 296/107, 109, 113, 117, 296/120.1, 118

[56] References Cited

U.S. PATENT DOCUMENTS

| 4,747,635 | 5/1988 | Wagner | 296/107 |
| 4,778,215 | 10/1988 | Ramaciotti | 296/107 |
| 4,784,428 | 11/1988 | Moy et al. | 296/107 |

FOREIGN PATENT DOCUMENTS

| 2327485 | 4/1975 | Fed. Rep. of Germany . | |
| 63-78811 | 4/1988 | Japan | 296/107 |
| 8602756 | 5/1988 | Netherlands | 296/107 |
| 369039 | 10/1969 | U.S.S.R. | 296/107 |

Primary Examiner—Margaret A. Focarino
Assistant Examiner—Andrew C. Pike
Attorney, Agent, or Firm—Barnes & Thornburg

[57] ABSTRACT

The invention is concerned with a stiffening of a surface portion of a flexible roof skin of a vehicle, which comprises a reinforcing section arranged at the roof skin and matched flexurally elastically to a curve of the roof skin in the surface portion. To prevent the effect of so-called roof skin fluttering, the reinforcing section can be subjected to stress by means of a tensioning device in such a way that it can be changed from a bent position thereof to a more sharply curved tensioning position when the roof skin is closed.

10 Claims, 2 Drawing Sheets

STIFFENING OF A SURFACE PORTION OF A FLEXIBLE ROOF SKIN OF A VEHICLE

BACKGROUND AND SUMMARY OF THE INVENTION

The invention is concerned with the stiffening of a surface portion of a flexible roof skin of a vehicle of the type comprising a reinforcing section arranged at the roof skin and matched flexurally elastically to a curve of the roof skin in the surface portion.

A stiffening of a flexible roof skin of this type is disclosed by German Patent Specification No. 2,327,485, wherein the insertion of a spring-steel strip into the roof skin of a folding hood underneath the rear triangular panes of the roof makes it possible for the flexible triangular panes to always fold uniformly. Since only a front length portion of the triangular panes is stiffened with the spring-steel strips, the folding line of the flexible triangular panes extends exactly behind the stiffened length portion. The stiffening effect of the spring-steel strip on the flank region of the roof skin is very limited and makes no appreciable contribution to preventing roof skin fluttering which occurs at high driving speeds when the roof is closed and which is caused by the airflow breakaway or separation at the rear region of the roof skin. However, this effect of roof skin fluttering is associated with the generation of relatively loud noise and is therefore detrimental to driving comfort. If the flexible panes of the roof skin are likewise influenced by this effect, there are, in addition, optical distortions which can impair vision at the rear.

An object of the present invention is, therefore, to provide a further stiffening of a surface portion of a flexible roof skin of a vehicle, in such a way that the effect of roof skin fluttering is markedly reduced over a surface portion of larger size.

This objective is achieved by the invention by providing a tensioning device for subjecting a reinforcing section of the roof skin to stress in such a way that the reinforcing section can be changed from a bent position to a more sharply curved tensioning position when the roof skin is closed. As a result the tension of the roof skin in the stiffened region is markedly increased over and above the basic tension by a hood frame.

Various tensioning devices which are preferably supported on the frame are contemplated by the invention for obtaining the associated curving of the reinforcing section.

No additional operating outlay is involved in an automatic activation of the tensioning device.

Especially simple curving of the reinforcing section is possible if both ends of the latter are subjected to an axial advance which results in more pronounced bending of the reinforcing section. At the same time, depending on the material of the roof skin, the reinforcing section can experience free deformation over its length, either together with the roof skin, between end clamping points or there can be on the roof skin a sliding guide which allows the reinforcing section to undergo longitudinal displacement relative to the roof skin.

Appropriately, the axial advance is transmitted to the reinforcing section purely mechanically via supporting frame parts in the course of the closing operation.

An especially simple, inexpensive and lightweight embodiment of the tensioning device is possible as a result of pulling means, such as wire cables or the like.

Thus, even several reinforcing sections can be changed to their tensioning positions simultaneously by two pulling means, so that a tensioning framework for rear windows, which does not impair the folding of these, can be formed very economically.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
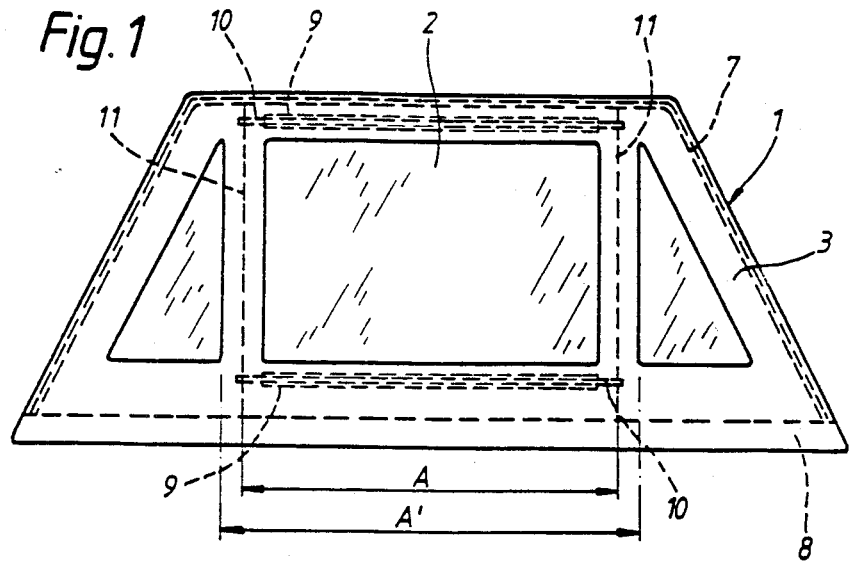
FIG. 1 shows a diagrammatic view of a closed folding hood from the rear constructed in accordance with a preferred embodiment of the invention.
Figure 2:
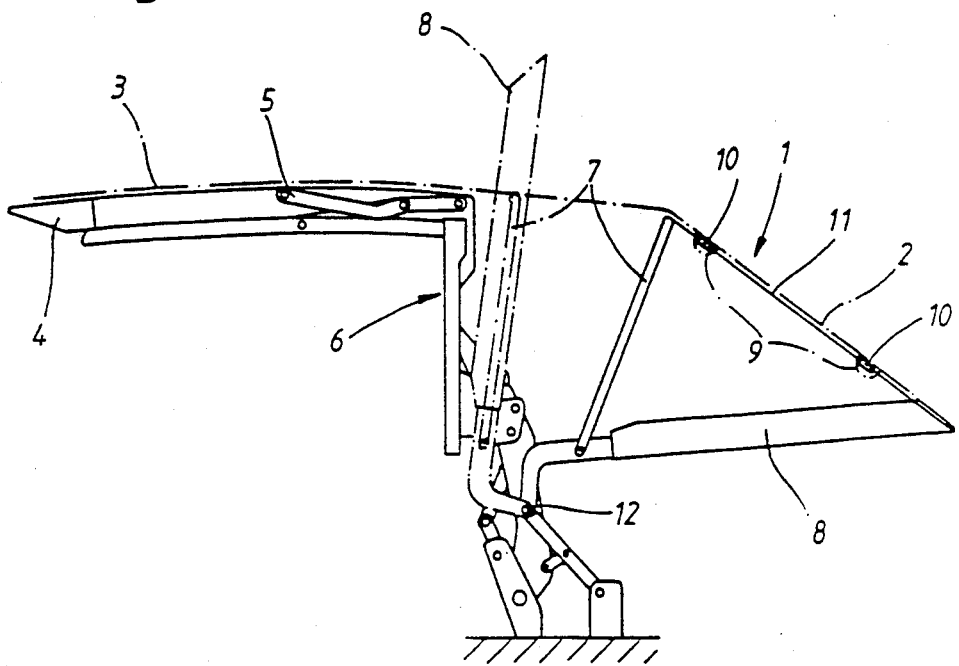
FIG. 2 shows a side view of the hood frame of the folding hood according to FIG. 1

A folding hood 1 of a convertible top vehicle (not shown) has a roof skin 3 and a central arrangement of a flexible rear window 2 of rectangular extension when the roof skin 3 is tensioned as shown in the Figures. To generate the normal tension of the roof skin 3, a front roof framework 4, an intermediate support 5, a main support 6, a corner support 7 and a roof-holding bar 8 forming a lower end of the folding hood 1 are provided in the conventional way as supporting frame parts.

To make it possible to prevent the occurrence of fabric flutter under normal tension at high driving speeds, the roof skin 3 is prestressed to a greater extent in the region of the rear window 2.

For this purpose, tubular guide loops 9 are sewn to an inner face of a hood fabric somewhat above a top edge of the rear window 2 and somewhat below a bottom edge thereof and extend parallel to associated window edges. The tubular guide loops 9 therefore form an integral part of an edge border for the rear window 2. These guide loops 9 terminate respectively at side edges of the rear window 2. Pushed into each of the two guide loops 9 with some peripheral play is a thin leaf-spring element 10 which consists of a narrow resilient strip having a length which is calculated so that the strip projects both ends from the associated guide loop 9. The two leaf-spring elements 10 are in a sharply curved tensioning position, since they are pre-stressed axially at both ends, i.e. subject to an axial compression via pulling cables 11 and are supported in a prestressed position. The pulling cables 11 extend at a short lateral distance from and parallel to the side edges of the rear window 2 and immediately below the obliquely extending roof skin 3, since they are stretched tautly by being fastened at ends thereof to the corner support 7 and to the roof-skin holding bar 8. An axial support of the leaf-spring elements 10 by the two pulling cables 11, which are designed here as wire cables, can, for example, be guaranteed simply by guiding the pulling cables 11 through bores provided in an end region of the leaf-spring elements 10.

Figure 3A:
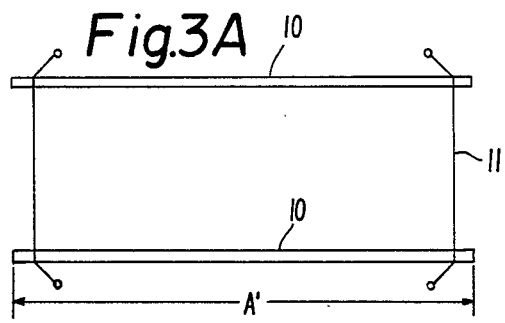
FIG. 3A and 3B illustrate reinforcing sections and tensioning device means of the folding hood in a relaxed state.
Figure 3B:
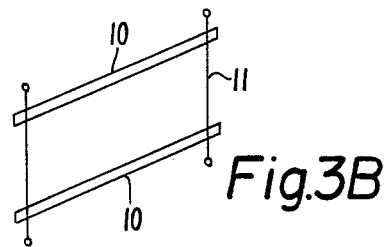
Figure 4A:
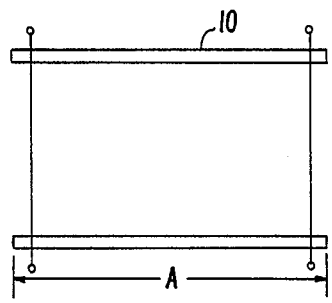
FIGS. 4A and 4B illustrate reinforcing sections and tensioning device means of the folding hood in a loaded state.
Figure 4B:
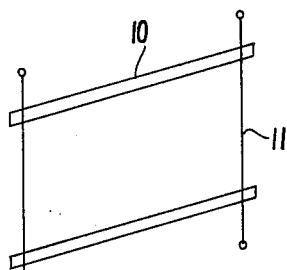

A distance A between the two tensioned pulling cables 11 is therefore selected so that the two leaf-spring elements 10 are in an arcuately curved position, as seen in FIGS. 4A-4B, in which they transmit additional tensioning forces to the roof skin 3, because they curve the roof skin 3 further rearwards in the region subjected to stress. If support at mutually opposite ends of the leaf-spring elements 10 is cancelled, the latter spring back into an initial position, as seen in FIGS. 3A-3B, in which they are bent according to an outer contour of the roof skin 3 under the normal tension. The distance A between the ends of the leaf-spring element 10 at a junction point with the corresponding pulling cables 11 thereby increases to the distance A' which is represented by broken lines in FIG. 1. Since the fabric of the roof skin 3 allows only slight stretching here, in the course of the springing-out movement of the leaf-spring elements 10, the elements 10 undergo a relative displacement in the associated guide loop 9.

Because the ends of the pulling cables 11 are fastened to the roof-skin holding bar 8 and to the corner support 7, the illustrated tensioning position of the pulling cables 11 is maintained only as long as the hood frame is in the closed position.

In order to open the folding hood 1, the roof-skin holding bar 8 first has to be pivoted forwards about a pivot axle 12 situation on a main bearing side, until a hood-box lid (not shown) fastened to the roof-skin holding bar 8 in the opposite direction can be swung up. During the course of this movement to erect the roof-skin holding bar 8, the roof skin 3 folds between the corner support 7 and the roof skin holding bar 8, since the corner support 7 mounted pivotably on the roof-skin holding bar 8 is moved towards the holding bar 8 until corner support 7 finally lies in a transverse plane thereof. In this erected position represented by broken lines, the pulling cables 11 are completely free of tensile stress, with the result that the leaf-spring elements 10 assume a sprung-out position automatically.

During the closing of the folding hood 1, after the hood-box lid has been closed again, the roof-skin holding bar 8 lastly has to be shifted rearwards out of its erected position pivoted forwards. At the same time, in the final phase of the closing movement, the pulling cables 11 become increasingly taut and exert a tensioning advance on the leaf-spring elements 10 synchronously at both ends, until the curved sprung-in position of the leaf-spring elements 10 is reached again.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. Stiffening arrangement for a surface portion of a flexible roof skin of a vehicle, which comprises a reinforcing section arranged at the roof skin and flexurally elastically fitted to a curve of the roof skin at the surface portion, wherein the reinforcing section includes tensioning device means for subjecting the reinforcing section to stress in such a way that the reinforcing section is changed from a bent configuration thereof to a tensioning configuration which is more sharply curved than the bent configuration when the roof skin is in a closed position.

2. Stiffening arrangement according to claim 1, wherein the tensioning device means is activated automatically when the roof skin is moved to the closed position.

3. Stiffening arrangement according to claim 2, wherein the reinforcing section can be subjected to load by a tensioning advance of the tensioning device means as a result of which a distance between reinforcing section ends can be reduced.

4. Stiffening arrangement according to claim 1, wherein the reinforcing section can be subjected to an axial compressional load by a tensioning advance of the tensioning device means, as a result of which a distance between reinforcing section ends can be reduced.

5. Stiffening arrangement according to claim 4, wherein the tensioning advance of the tensioning device means results from movement of supporting frame parts of a folding hood in the course of an operation of closing the roof skin.

6. Stiffening arrangement according to claim 5, wherein when the roof is moved to the closed position, the surface portion to be stiffened is bordered by two frame parts of the supporting frame parts of the folding hood which extend approximately parallel to the reinforcing section and which can be moved toward one another when a folding hood is opened, wherein fastened between the two frame parts, and extending transversely relative to these two frame parts, is the tensioning device means which includes two substantially flexible pulling means spaced at a distance from one another, between which the ends of the reinforcing section are held and at the same time supported axially, and wherein the distance between the pulling means is calculated so that the tensioning of the tensioning device means is transmitted to the reinforcing section as the axial compressional load which is applied synchronously at both ends via the pulling means during the course of the operation of closing the folding hood.

7. Stiffening arrangement according to claim 6, wherein at least one reinforcing section is held between two pulling means.

8. Stiffening arrangement according to claim 7, wherein the reinforcing sections are narrow strips of small thickness, and wherein the reinforcing sections are arranged as a roof skin insert below and above a flexible window pane integrated in the roof skin.

9. Stiffening arrangement according to claim 1, wherein the reinforcing section comprises leaf-spring means.

10. Stiffening arrangement according to claim 9, wherein the tensioning device means comprises pulling cables.

* * * * *